United States Patent
Wheeler et al.

(10) Patent No.: US 6,691,556 B2
(45) Date of Patent: Feb. 17, 2004

(54) AUTOMATIC DATA LOGGING KIT AND METHOD

(75) Inventors: Scott Andrew Wheeler, Clifton Park, NY (US); Roderick Mark Lusted, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/150,489

(22) Filed: May 20, 2002

(65) Prior Publication Data

US 2003/0213285 A1 Nov. 20, 2003

(51) Int. Cl.[7] .................................................. G01M 3/08
(52) U.S. Cl. ........................ 73/40.5 R; 73/40; 73/49.1; 702/51; 324/134; 310/195
(58) Field of Search ................................ 73/40.5 R, 40, 73/49.1; 702/51; 324/134; 310/195

(56) References Cited

U.S. PATENT DOCUMENTS

| | | | |
|---|---|---|---|
| 3,755,702 A | * | 8/1973 | Willyoung .................... 310/53 |
| 4,801,877 A | | 1/1989 | Herrick et al. |
| 4,811,567 A | | 3/1989 | Bakanowski et al. |
| 4,940,932 A | | 7/1990 | Herrick et al. |
| 5,045,779 A | | 9/1991 | Herrick et al. |
| 5,231,348 A | | 7/1993 | Herrick et al. |
| 5,287,726 A | | 2/1994 | Burritt |
| 5,331,747 A | | 7/1994 | Stanton |
| 5,837,879 A | | 11/1998 | Zick |
| 6,367,311 B1 | * | 4/2002 | Garg ....................... 73/40.5 R |

* cited by examiner

Primary Examiner—Helen Kwok
Assistant Examiner—André K. Jackson
(74) Attorney, Agent, or Firm—Nixon & Vanderhye P.C.

(57) ABSTRACT

An automatic data logging kit is used with a hydraulic integrity test kit for testing a liquid cooled stator bar system. The automatic data logging kit includes a spool piece having end connectors attachable between the liquid cooled stator bar system and the hydraulic integrity test kit as well as a plurality of sensor receptacles. At least one temperature sensor insertable within an interior of the liquid cooled stator bar system is coupled with an output connector operatively securable in the first of the sensor receptacles in the spool piece. At least one pressure sensor is also operatively securable in one of the spool piece sensor receptacles. A control unit receives output from the sensors and calculates a leak rate based on the received sensor output. The automatic data logging kit provides automatic data logging capabilities for pressure-decay and vacuum-decay cycle tests, increased accuracy of the pressure-decay and vacuum-decay data and reduced cycle time in determining the leak rates.

22 Claims, 2 Drawing Sheets

AUTOMATIC DATA LOGGING KIT AND METHOD

BACKGROUND OF THE INVENTION

The present invention relates to an automatic data logging kit that is composed of data logging equipment, pressure sensors, and temperature sensors along with mechanical hardware that is used with hydraulic integrity test (HIT) skids for testing liquid cooled stator bar systems found within power generators. The kit provides automatic data logging capabilities for the pressure-decay and vacuum-decay cycle tasks, increased accuracy of the pressure-decay and vacuum-decay data, and reduced cycle time. Computer logic calculates leak rates for each of these tasks. Additionally, the equipment can be used to determine and/or accommodate leaks in the test equipment.

Large dynamoelectric equipment, such as generators, typically use branched fluid cooling systems. Parts of this equipment, such as the stator coils, are internally cooled by the circulation of a liquid. Generally, the operational atmosphere of these parts is pressurized hydrogen. The pressure of the coolant in the coil is less, by design, than the pressure of the hydrogen ambient pressure. Theoretically, a leak in a coil carrying coolant should allow the entry of hydrogen to the coil rather than venting of fluid to the atmosphere. Unfortunately, a bubble of such hydrogen gas within the coil is sufficient to at least partially block the passage of the fluid coolant, thus creating hot spots that deteriorate stator insulation, diminish conductivity and ultimately cause shutdown of the equipment.

Periodic tests of conductivity of the stators are useful in prevention of accidents and unscheduled shutdowns of the equipment. The result of such tests depend, to some extent, on the degree to which all fluids and contaminants are first removed from the cooling lines. Periodic test protocols are also useful for determining advanced warning of breakdowns in the integrity of the lines, however minute. A hydraulic integrity test skid for performing these tests on dynamoelectric equipment is disclosed in U.S. Pat. No. 5,287,726.

One of the tests performed with the use of the HIT skids is a pressure-decay test, which measures the drop in pressure over time for a potentially leaking liquid cooled stator bar system in a generator. Current methods for running the pressure-decay test cycle are to perform the test over a twenty-four hour period and manually record readings once every hour. Inaccuracies can occur, however, with a sampling rate of one reading per hour and by the manual recording of data points including internal pressure, atmospheric pressure and multiple temperature readings. Still further, inaccurate volume measurements accounting for the HIT skid internal plumbing, pressure tanks, valves and interconnecting plumbing between the HIT skid and generator pervade data input for calculations in the pressure-decay cycle, adding a level of inaccuracy into the results. In addition, inaccurate temperature measurements can undermine the test due to the dependence on temperature by internal pressure. Additionally, the twenty-four hour period for the test can be significantly reduced to shorten overall outage time.

Another test performed with the use of the HIT skids is a vacuum-decay test, which measures an increase in pressure over time for a potentially leaking liquid-cooled stator bar system after being placed in a vacuum or reduced pressure state. Problems similar to those in the pressure-decay test, however, also occur with conventional vacuum-decay testing methods.

BRIEF DESCRIPTION OF THE INVENTION

In an exemplary embodiment of the invention, an automatic data logging kit is provided for use with a hydraulic integrity test skid for testing a liquid cooled stator bar system. The automatic data logging kit includes a spool piece having end connectors attachable between the liquid cooled stator bar system and the hydraulic integrity test skid and a plurality of sensor receptacles. At least one temperature sensor is insertable within an interior of the liquid cooled stator bar system and includes an output connector operatively securable in a first of the sensor receptacles. At least one pressure sensor is operatively securable in a second of the sensor receptacles. A control unit receives output from the sensors and calculates a leak rate based on the received sensor output.

In another exemplary embodiment of the invention, the automatic data logging kit includes a spool piece with end connectors attachable between the liquid cooled stator bar system and the hydraulic integrity test skid. An elongated temperature probe is insertable within an interior of the liquid cooled stator bar system and has an output connector operatively securable in a first of the sensor receptacles. With the pressure sensor secured in a second of the sensor receptacles, a control unit receives output from the sensors and calculates a leak rate based on the received sensor output.

In yet another exemplary embodiment of the invention, a method of automatically logging data for testing a generator cooling system includes the steps of (a) logging data concerning temperature and pressure within the generator cooling system, the data being received from sensor outputs operatively coupled with the generator cooling system; and (b) automatically calculating a leak rate based on the logged data.

DETAILED DESCRIPTION OF THE INVENTION

Figure 1:
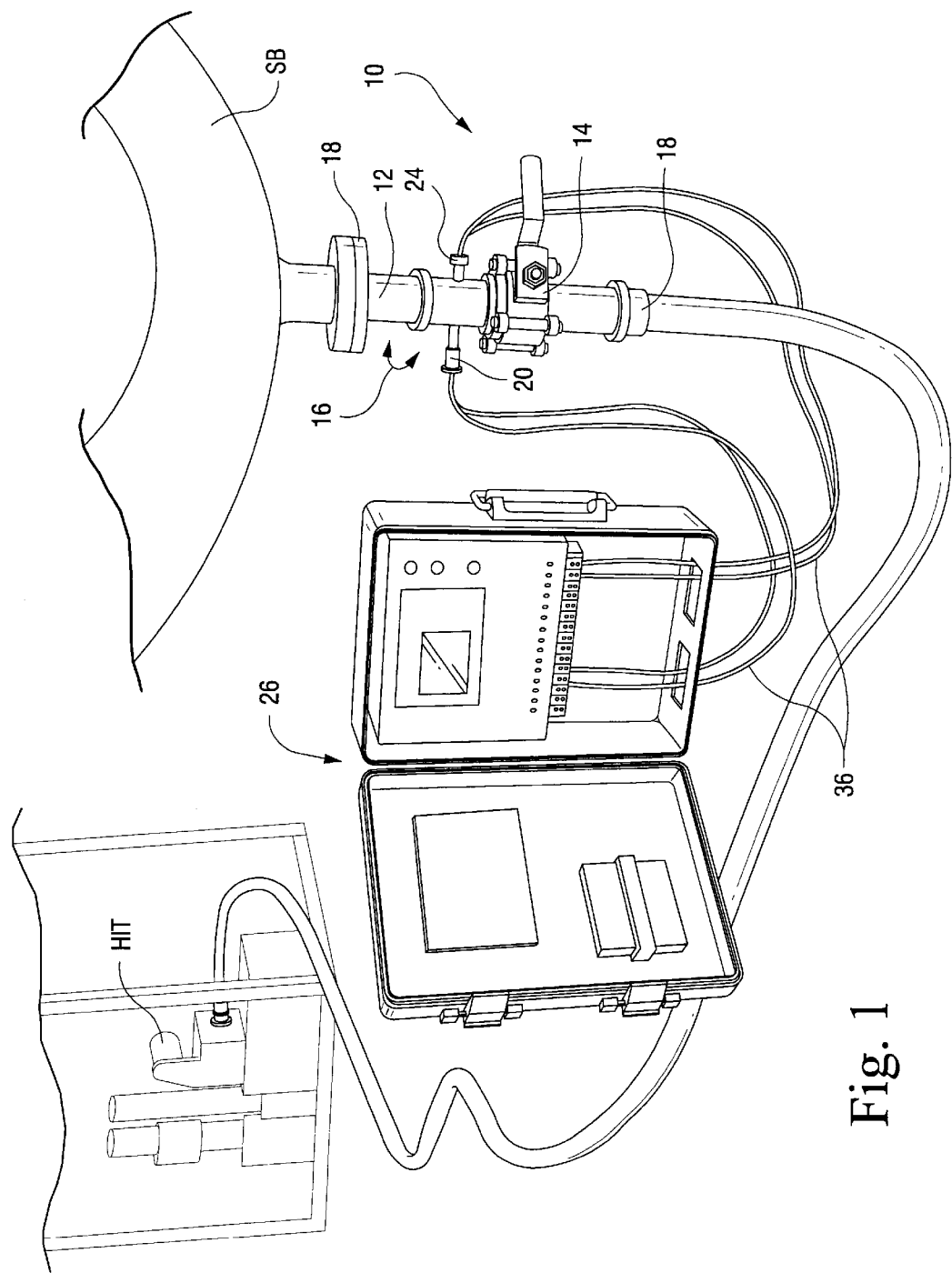
FIG. 1 shows the automatic data logging kit disposed between a liquid cooled stator bar system and a hydraulic integrity test skid.

The automatic data logging kit of the present invention works with any generator liquid cooled stator bar system and any HIT skid that could be used for testing a generator cooling system. With reference to FIG. 1, the ADL kit 10 is installed between the stator bar system SB and the HIT skid. The kit itself is a self-contained package housing the various hardware components, including pressure sensors, temperature sensors, wiring, adaptors, field-ready computer hardware, etc. The robust system uses adaptors to plumb into the existing lines between the generator plumbing and the HIT skid.

A spool piece 12 is provided with an isolation valve 14 and sensor receptacles 16 as connections for the temperature and pressure sensors. The isolation valve 14 can be formed of any suitable construction and ensures robust and positive sealing designed for field use longevity to selectively block flow to the HIT skid. End connectors 18 are provided at ends of the spool piece 12 to facilitate connection to the existing lines. A suitable end connector is the Quick Flange, Model NW 50 ISO-QF available from JPS Vacuum Products of Norwalk, Conn.

The spool piece 12 is provided with plumbing provisions for enclosing three or more pressure sensors 20 in a manner that the sensors are protected for field use. Using three pressure sensors 20, such as pressure transducers, computer hardware and logic can be used to monitor the three sensors 20 simultaneously and detect if one of the pressure sensors is malfunctioning by comparing to the other two readings. As a consequence, accurate pressure readings throughout the ADL kit's use can be ensured.

Figure 2:
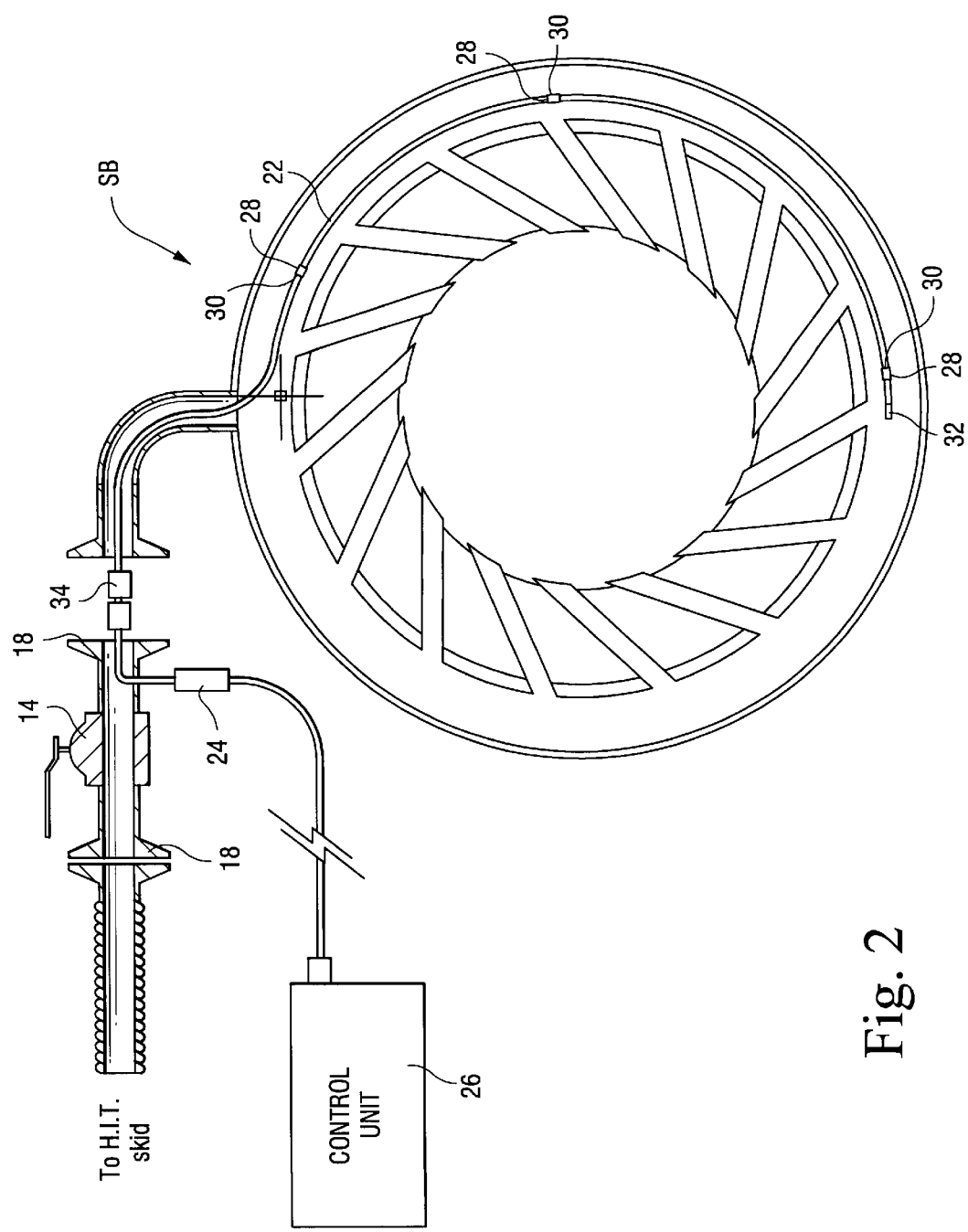
FIG. 2 shows the automatic data logging kit of FIG. 1 with a temperature probe extending within an interior of the liquid cooled stator bar system.

With reference to FIG. 2, a temperature probe 22 is insertable within an interior of the liquid cooled stator bar system SB and is subsequently coupled to an output connector 24 during assembly. The output connector 24 enables the signals or data from the temperature probe 22 to be transmitted to a control unit 26 (described below). The temperature probe 22 is preferably provided with multiple zones 28 of temperature monitoring. Three zones 28 are shown in FIG. 2. The temperature zones 28 are spaced, preferably equally spaced, along the length of the probe 22. A three-foot entry length near the terminal end 34 may be included. There may be several different length probes designed and fabricated to allow for generators of varying sizes as well as more or fewer temperature zones 28. For example, one length of the probe may be ten feet long, with another length being twenty feet long.

Preferably, each of the measurement zones 28 will be provided with three or more temperature sensors 30, such as thermocouples, RTD's (resistance temperature devices) or the like for redundancy, enabling the control system to determine whether one or more of the temperature sensors is malfunctioning. Additionally, the probe 22 is designed to be prevented from contacting the wall surface of the generator, for example via the use of a protective sleeve with air gaps at the temperature sensor locations or via a mesh layer between the protective layer and the temperature sensors.

Preferably, the temperature probe 22 is enclosed in a protective sheath to protect the sensor wires. The tip 32 of the probe is constructed with a rounded nose cone piece to prevent the probe from entering the side ports for the hose nipples. The terminal end 34 of the probe is provided with one connector permanently fixed to make all the connections for the multiple temperature sensors 30, yet be compact enough to fit within the two-inch diameter plumbing. The connection also features a robust and secure safety mechanism to eliminate the chances of accidental disconnection. In this context, in a preferred embodiment, this connection should be strong enough to withstand a tensile force of at least fifteen pounds to prevent a snagged line from being disconnected inadvertently. Additionally, the connections may be keyed to prevent user confusion. The terminal end 34 of the probe 22 is coupled with the output connector 24.

The control unit 26 contains a computer system including a display, such as an LCD display with or without touch-screen functionality or the like, and receives data outputs from the pressure sensors 20 and temperature sensors 30 via cables 36 or via wireless communication. The computer system of the control unit 26 may be any known system suitable for the described purpose. Generally, the system includes at least a CPU, memory and components for interfacing with a user. The control unit 26 records the signals from the sensors, converting electronic values to engineering units, logs the data and computes leak rates and related theoretical data such as the exponential time decay constant for the leaks.

To perform a test, a pressure differential is effected in the generator windings either positively via the HIT skid compressor to about 60–90 psi or negatively via the HIT skid vacuum component to less than atmospheric pressure. The sampling rate will be significantly smaller than the current one reading per hour sampling rate of conventional arrangements. Preferably, data readings from the various sensors are logged at periodic intervals, such as every five to ten minutes or more for a duration up to twenty-four hours. The system is capable of recording data at much more frequent intervals if desirable, such as 0.01 Hz or faster. For every time interval of data logging, software stored within the computer system saves the data to internal storage media to prevent loss of cumulative data in the event of a power outage or disruption. The computer system actively monitors the incoming data during the test and computes a leak rate factoring in all possible effects of error, such as sensor tolerance, average temperature readings, and hardware tolerances. Once a leak rate is calculated that is not affected by the noted tolerances, the leak rate is immediately reported. Audible and visual alarms may accompany the reported leak rate, allowing the operator to end the test early for a leak rate that clearly passes or fails the pressure decay cycle.

Preliminary testing suggests that a calculated leak rate from a pressure-decay cycle can be attained in as little as two hours and from a vacuum-decay cycle in as little as one hour. Averaging and computer logic is used to reduce the effect of noise and smooth data trend lines. Assuming all sensors are operating properly, recorded data points are logged as the average of the multiple sensors at a specific location. As noted above, the computer system detects if one of the multiple sensors is faulty by comparing its readings to correspondingly located sensors. In the event that a faulty sensor is detected, the system uses only the average reading between the remaining sensors. The system will also indicate to the user visually via the display which sensor may be faulty and that its reading is not being logged nor used in the calculations.

For a pressure-decay cycle, data may be logged anywhere from four to twenty-four hours, dependent upon the calculated leak rate. After four hours, an average leak rate can be calculated and reported to the user. If the leak rate is of a steady state nature and constant value, then the pass/fail criteria may be applied and the test may be stopped. If the leak rate is still fluctuating with no attainable trend line, then the average leak rate is not reported and the test continues to run for another fifteen minutes. Subsequently, every fifteen minutes thereafter, the same logic evaluates the trend line and determines if a reportable leak rate exists.

The computer system of the control unit 26 calculates the leak rate based on the ideal gas law:

$$pv = mR_{air}T$$

where p=Absolute Internal Pressure ($lb_f/ft^2$)
v=Internal Volume ($ft^3$)
m=Mass of Air ($lb_m$)
T=Absolute temperature of air (° R)
$R_{air}$=Constant for air ($ft\text{-}lb_f/lb_m\text{-}°R$) (value of 53.384 for air).

The resulting equation for calculating the leak rate is:

$$L = \frac{239.36 \cdot V}{H} \cdot \left\{ \frac{M1 + B1}{273.15 + T1} - \frac{M2 + B2}{273.15 + T2} \right\}$$

where:
L=Leak Rate ($ft^3$/day)
V=Test Volume ($ft^3$)

H=Time into Test (Hours)

B1, B2=Initial (B1) and Final (B2) atmospheric pressure ("Hg)

M1, M2=Initial (M1) and Final (M2) winding pressure ("Hg)

T1, T2=Initial (T1) and Final (T2) winding temperature (°C.).

The leak rate can be evaluated faster using helium. That is, instead of pressurizing the windings using the HIT skid compressor, bottled helium may be used. If the user is pressure testing with helium, an option in the software allows the user to indicate this application. The calculated leak rate will then be multiplied by 0.385 in order to convert the leak rate for helium to the leak rate for air.

In one exemplary embodiment of the invention, the pass or fail value for this leak rate is 1.0 ft$^3$/day. Of course, other predefined conditions/values may be appropriate for a particular system. The software uses this predefined condition for its logic while factoring in all sensor tolerances and inaccuracies before reporting a pass or fail result to the user.

For a vacuum-decay cycle, data preferably will be logged continuously anywhere from one to four hours. After one hour, an average leak rate can be calculated and reported to the user. If the leak rate is of a steady-state nature and constant value, then the pass/fail criteria may be applied and the test may be stopped. If the leak rate is still fluctuating with no attainable trend line, then the average leak rate is not reported and the test continues to run for another fifteen minutes. Subsequently, every fifteen minutes thereafter, the same logic evaluates the trend line again and determines if a reportable leak rate exists.

For determining the leak rate using the vacuum-decay cycle, the computer system of the control unit 26 uses the following equation:

$$L = \frac{3.06 \cdot V \cdot P \cdot 10^{-4}}{T}$$

where:

L=Leak Rate (ft$^3$/day)

P=Change in Pressure, P2–P1, (Microns)

T=Time into test (Hours)

V=Test volume (ft$^3$).

The pass or fail value for this leak rate in an exemplary embodiment of the invention is 3.0 ft$^3$/day. The software uses this value for its logic and also factors in all sensor tolerances and inaccuracies before reporting to the user a pass or fail result.

A related vacuum-decay test can be performed for the HIT skid equipment to validate any existing minor leak rates in the test hardware. In a preferred embodiment, calculated leak rates from this test should not exceed 0.15 ft$^3$/day, as the equipment should then be replaced for leakage problems. This test is run for a range of ten to thirty minutes, while leak rates are calculated and visually reported to the user after about ten minutes.

An alternate method of calculating the leak rates may be by evaluating the time constant for exponential half-life pressure-decay or vacuum-decay to occur. Other physical or theoretical methods may also be used.

To determine the test volume V for use with either the pressure-decay cycle or the vacuum-decay cycle, after the windings are pressurized to P1, the isolation valve 14 is closed, and the hose connecting the HIT skid is disconnected. A known volume, V1, is then attached to the spool piece 12. Once connected and sealed, the isolation valve 14 is opened, and a new pressure, P2, is acquired for both volumes. The following formula is used to then calculate the internal volume of the windings:

$$V_{winding} = \frac{V_{known} P_2}{P_1 - P_2}$$

where:

$V_{winding}$=Internal volume of liquid cooled stator bars $V_{known}$=Known volume attached to spool piece $P_1$=Internal absolute pressure before the isolation valve is opened $P_2$=Internal absolute pressure after isolation valve is opened.

Via the computer system interface and display and the software stored in the computer system, the user can select a view of each individual sensor's engineering value, trend line or average reading. Alternatively, the user can display groups of sensor engineering values, trend lines or average readings such as all temperature sensors in one header. The current calculated leak rate, if available, or range of leak rates calculated thus far may also be displayed. Via the user interface, the user can zoom in and zoom out to or from a specific time period on specific functions/displays, select which test to run (pressure-decay, vacuum-decay, or a vacuum test for HIT skid equipment), start, stop and reset of data collection periods for each test, save logged data points and calculated leak rates to a removable media, select engineering units, i.e., Pascal, psi, inches of Hg, etc. The system additionally includes a "reset" button or self-check/default value/zeroing function.

As an alternative to directly connecting the cables 36 to the control unit 26, a junction box (not shown) may be used, whereby if a generator has stator bar piping headers at opposite ends (single pass flow), the junction box would eliminate multiple wires from being run across the turbine deck. Instead, the junction box has one jacketed cable connecting it to the control unit 26. Sensor wires then only connect to the junction box at that end of the generator, and the amount of cluttered wires is reduced at the site. The junction box also helps eliminate EMI effects as the junction box transmits digital signals instead of analog signals back to the main module.

Preferably, all hardware, connections, sensors, joints, bulkheads, etc. are designed to withstand at least a positive pressure of 150 psig and a vacuum of 0.5 micron ($5 \times 10^{-4}$ TORR) throughout a temperature range of –2 to 174° F. (–20 to 80° C.). These values, of course, are exemplary and may be altered according to particular operating conditions and parameters.

Preferably, the sensors should be chosen or designed to prevent noise interferences, such as EMF. The temperature sensors 30, such as thermocouples or RTD's, should be able to sense temperature values in the range of 0 to 60° C., with an absolute accuracy of 0.5° C., and a relative accuracy (linearity) of 0.2° C. The internal pressure sensors, such as pressure transducers, should be able to sense pressure values in the range of 0–100 psig, with an absolute accuracy of 0.05% full scale, and a relative accuracy (linearity) of 0.05% full scale. Atmospheric pressure sensors should be able to sense pressure values in the range of 0–15 or 0–20 psia, with an absolute accuracy of 0.05% full scale, and a relative accuracy (linearity) of 0.05% full scale. Pressure sensors for detecting both internal and atmospheric pressures may alternatively be used. The pressure sensors may be provided with built-in circuitry to account for temperature changes within the specified operating temperature range and have a thermal effect of 0.003% or less. Similar to above, these values are exemplary and may be altered according to particular operating conditions and parameters.

The ADL kit of the invention offers much-improved accuracy in determining the actual leak rate of a stator bar system and is able to conclude passing or failing results in a shorter period of time. Digitizing the data collection method, the automated system records multiple data points up to and beyond the 500 hz level. This system has the ability to self-generate plots, calculations and conclusions and has the ability to transmit the data several ways, including but not limited to serial connections, USB connections, infrared connections, and Internet connections such as LAN, cable modems, or satellite modems.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An automatic data logging kit for use with a hydraulic integrity test skid for testing a liquid cooled stator bar system, the automatic data logging kit comprising:
    a spool piece installable between the liquid cooled stator bar system and the hydraulic integrity test skid, the spool piece including end connectors attachable between the liquid cooled stator bar system and the hydraulic integrity test skid and a plurality of sensor receptacles;
    at least one temperature sensor insertable within an interior of the liquid cooled stator bar system and having an output connector operatively securable in a first of the sensor receptacles;
    at least one pressure sensor operatively securable in a second of the sensor receptacles; and
    a control unit receiving output from the at least one temperature sensor and the at least one pressure sensor, the control unit calculating a leak rate based on the received sensor output.

2. An automatic data logging kit according to claim 1, wherein the spool piece comprises a generally cylindrical construction, and wherein the plurality of sensor receptacles are formed through a side surface thereof.

3. An automatic data logging kit according to claim 1, wherein the spool piece comprises an isolation valve.

4. An automatic data logging kit according to claim 1, wherein the end connectors are quick flanges.

5. An automatic data logging kit for use with a hydraulic integrity test skid for testing a liquid cooled stator bar system, the automatic data logging kit comprising:
    a spool piece including end connectors attachable between the liquid cooled stator bar system and the hydraulic integrity test skid and a plurality of sensor receptacles;
    at least one temperature sensor insertable within an interior of the liquid cooled stator bar system and having an output connector operatively securable in a first of the sensor receptacles;
    at least one pressure sensor operatively securable in a second of the sensor receptacles; and
    a control unit receiving output from the at least one temperature sensor and the at least one pressure sensor, the control unit calculating a leak rate based on the received sensor output,
    wherein the at least one temperature sensor comprises a temperature probe insertable within the interior of the liquid cooled stator bar system, the temperature probe comprising multiple sensor zones spaced along a length of the temperature probe.

6. An automatic data logging kit according to claim 5, wherein each of the multiple sensor zones comprises multiple temperature sensors.

7. An automatic data logging kit according to claim 6, comprising multiple pressure sensors operatively securable in at least one respective sensor receptacle.

8. An automatic data logging kit according to claim 7, wherein the control unit determines data points for calculating the leak rate, the data points being an average of outputs from the multiple temperature sensors of each sensor zone and outputs from the multiple pressure sensors.

9. An automatic data logging kit according to claim 8, wherein the control unit is configured to determine whether any of the temperature sensors and the pressure sensors is faulty based on a comparison of respective outputs.

10. An automatic data logging kit according to claim 1, comprising multiple pressure sensors operatively securable in respective sensor receptacles.

11. An automatic data logging kit according to claim 1, wherein the control unit is configured to calculate the leak rate using a pressure-decay test based on the received sensor output according to:

$$L = \frac{239.36 \cdot V}{H} \cdot \left\{ \frac{M1 + B1}{273.15 + T1} - \frac{M2 + B2}{273.15 + T2} \right\}$$

where:
    L=Leak Rate (ft$^3$/day)
    V=Test Volume (ft$^3$)
    H=Time into Test (Hours)
    B1, B2=Initial (B1) and Final (B2) atmospheric pressure ("Hg)
    M1, M2=Initial (M1) and Final (M2) winding pressure ("Hg)
    T1, T2=Initial (T1) and Final (T2) winding temperature (° C).

12. An automatic data logging kit according to claim 1, wherein the control unit is configured to calculate the leak rate using a vacuum-decay test based on the received sensor output according to:

$$L = \frac{3.06 \cdot V \cdot P \cdot 10^{-4}}{T}$$

where:
    L=Leak Rate (ft$^3$/day)
    P=Change in Pressure, P2−P1, (Microns)
    T=Time into test (Hours)
    V=Test volume (ft$^3$).

13. An automatic data logging kit according to claim 1, wherein the control unit designates the leak rate as PASS or FAIL according to predefined conditions.

14. An automatic data logging kit according to claim 13, wherein the control unit factors in sensor and hardware tolerances and linearity effects to calculate the leak rate and to designate the leak rate as PASS or FAIL.

15. An automatic data logging kit for use with a hydraulic integrity test skid for testing a liquid cooled stator bar system, the automatic data logging kit comprising:

a spool piece installable between the liquid cooled stator bar system and the hydraulic integrity test skid, the spool piece including end connectors attachable between the liquid cooled stator bar system and the hydraulic integrity test skid, the spool piece comprising a plurality of sensor receptacles through an exterior surface;

an elongated temperature probe insertable within an interior of the liquid cooled stator bar system and having an output connector operatively securable in a first of the sensor receptacles;

at least one pressure sensor operatively securable in a second of the sensor receptacles; and a control unit receiving output from the at least one temperature sensor and the at least one pressure sensor, the control unit calculating a leak rate based on the received sensor output.

16. An automatic data logging kit according to claim 15, wherein the temperature probe comprises multiple sensor zones spaced along a length of the temperature probe, and wherein each of the multiple sensor zones comprises multiple temperature sensors.

17. An automatic data logging kit according to claim 16, comprising multiple pressure sensors operatively securable in at least one respective sensor receptacle.

18. A method of automatically logging data for testing a generator cooling system, the method comprising:

(a) logging data concerning temperature and pressure within the generator cooling system, the data being received from sensor outputs operatively coupled with the generator cooling system; and (b) automatically calculating a leak rate based on the logged data while factoring in possible effects of error including sensor tolerance, average temperature readings, and hardware tolerances.

19. A method according to claim 18, further comprising designating the leak rate calculated in (b) as PASS or FAIL according to predefined conditions.

20. A method according to claim 18, wherein step (b) is practiced according to:

$$L = \frac{239.36 \cdot V}{H} \cdot \left\{ \frac{M1 + B1}{273.15 + T1} - \frac{M2 + B2}{273.15 + T2} \right\}$$

where:

L=Leak Rate (ft$^3$/day)
V=Test Volume (ft$^3$)
H=Time into Test (Hours)
B1, B2=Initial (B1) and Final (B2) atmospheric pressure ("Hg)
M1, M2=Initial (M1) and Final (M2) winding pressure ("Hg)
T1, T2=Initial (T1) and Final (T2) winding temperature (° C.).

21. A method according to claim 18, wherein step (b) is practiced according to:

$$L = \frac{3.06 \cdot V \cdot P \cdot 10^{-4}}{T}$$

where:

L=Leak Rate (ft$^3$/day)
P=Change in Pressure, P2−P1, (Microns)
T=Time into test (Hours)
V=Test volume (ft$^3$).

22. A method of logging data for testing a liquid cooled stator bar system using the automatic data logging kit of claim 1.

* * * * *